(12) United States Patent
Chen et al.

(10) Patent No.: US 11,405,744 B2
(45) Date of Patent: Aug. 2, 2022

(54) POSITIONING METHOD AND DEVICE, ON-BOARD EQUIPMENT, VEHICLE, AND POSITIONING SYSTEM

(71) Applicant: APOLLO INTELLIGENT CONNECTIVITY (BEIJING) TECHNOLOGY CO., LTD., Beijing (CN)

(72) Inventors: Yan Chen, Beijing (CN); Kangli Jiang, Beijing (CN)

(73) Assignee: APOLLO INTELLIGENT CONNECTIVITY (BEIJING) TECHNOLOGY CO., LTD.

(*) Notice: Subject to any disclaimer, the term of this patent is extended or adjusted under 35 U.S.C. 154(b) by 0 days.

(21) Appl. No.: 17/128,956

(22) Filed: Dec. 21, 2020

(65) Prior Publication Data

US 2021/0195365 A1 Jun. 24, 2021

(30) Foreign Application Priority Data

May 11, 2020 (CN) .......................... 202010393421.0

(51) Int. Cl.
*H04W 4/02* (2018.01)
*H04W 4/40* (2018.01)
(Continued)

(52) U.S. Cl.
CPC ............. *H04W 4/02* (2013.01); *G01C 21/28* (2013.01); *G06V 10/98* (2022.01); *G06V 20/56* (2022.01); *H04W 4/06* (2013.01); *H04W 4/40* (2018.02)

(58) Field of Classification Search
None
See application file for complete search history.

(56) References Cited

U.S. PATENT DOCUMENTS 10,466,717 B1 11/2019 Su et al.
2013/0162824 A1 6/2013 Sung et al.
(Continued)

FOREIGN PATENT DOCUMENTS

CN 106651953 A 5/2017
CN 106969766 A 7/2017
(Continued)

OTHER PUBLICATIONS

Vehicle's Pose and Position Estimation using Monocular Camera based on Road Sign, Shangdong University, Thesis for Master Degree, May 30, 2017, pp. 1-39.
(Continued)

*Primary Examiner* — Adolf Dsouza
(74) *Attorney, Agent, or Firm* — Dilworth IP, LLC

(57) ABSTRACT

A positioning method and device, on-board equipment, a vehicle, an electronic device, a positioning system, and a storage medium, relating to the field of autonomous driving technologies. The method includes receiving a broadcast message broadcast by a first object, the broadcast message carrying broadcast positioning information of the first object, recognizing a collected image of a second object to acquire recognition information of the second object, the recognition information including image recognition positioning information of the second object, and determining location information of a control device according to the acquired broadcast positioning information and image recognition positioning information.

20 Claims, 5 Drawing Sheets

(51) Int. Cl.
    *G01C 21/28*     (2006.01)
    *H04W 4/06*     (2009.01)
    *G06V 10/98*     (2022.01)
    *G06V 20/56*     (2022.01)

(56) References Cited

U.S. PATENT DOCUMENTS

2016/0305794 A1* 10/2016 Horita ................ G06K 9/00825
2018/0293453 A1   10/2018 Viswanathan

FOREIGN PATENT DOCUMENTS

| CN | 107230375 | A | 10/2017 |
| CN | 107314771 | A | 11/2017 |
| CN | 108521800 | A | 9/2018 |
| CN | 109544633 | A | 3/2019 |
| CN | 109855602 | A | 6/2019 |
| CN | 109856591 | A | 6/2019 |
| CN | 110033489 | A | 7/2019 |
| CN | 110906939 | A | 3/2020 |
| WO | 2010115020 | A2 | 10/2010 |
| WO | WO-2010115020 A2 * | | 10/2010 ................ G01J 3/46 |

OTHER PUBLICATIONS

First Office Action in CN Patent Application No. 202010393421.0 dated Aug. 26, 2021.
European Search Report in EP Patent Application No. 20217384.5 dated Jul. 1, 2021.
Second Office Action in CN Patent Application No. 202010393421.0 dated Apr. 20, 2022.

\* cited by examiner

```
┌─────────────────────────────────────────────────┐  S201
│  Receiving a broadcast message broadcast by a first object  │
└─────────────────────────────────────────────────┘
                          │
                          ▼
┌─────────────────────────────────────────────────┐  S202
│  Recognizing a collected image of a second object           │
│  to obtain recognition information of the second object     │
└─────────────────────────────────────────────────┘
                          │
                          ▼
┌─────────────────────────────────────────────────┐  S203
│  Determining a coordinate conversion parameter according to broadcast │
│  positioning information and image recognition positioning information │
└─────────────────────────────────────────────────┘
                          │
                          ▼
┌─────────────────────────────────────────────────┐  S204
│  Generating location information according to the coordinate │
│  conversion parameter and the image recognition positioning information │
└─────────────────────────────────────────────────┘
```

FIG. 3

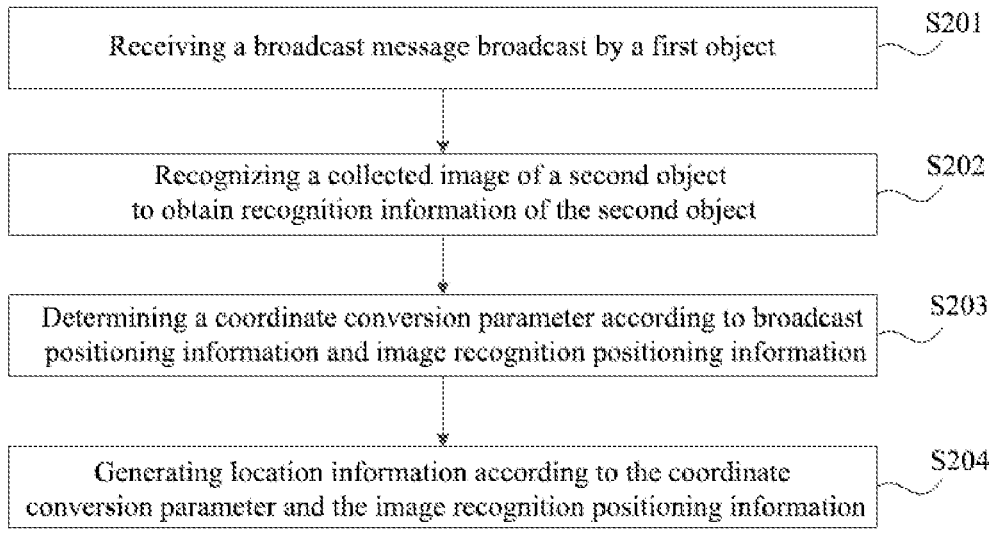

FIG. 4

POSITIONING METHOD AND DEVICE, ON-BOARD EQUIPMENT, VEHICLE, AND POSITIONING SYSTEM

CROSS-REFERENCE TO RELATED APPLICATION

This application claims priority to Chinese Patent Application No. 202010393421.0, filed on May 11, 2020, which is hereby incorporated by reference in its entirety.

TECHNICAL FIELD

Embodiments of the present disclosure relates to the field of computer technologies and, in particular, to the field of autonomous driving technologies, and specifically relate to a positioning method and device, on-board equipment, a vehicle, a positioning system, and a storage medium.

BACKGROUND

With the development of science and technology, positioning technology is widely used in various products, such as drones, vehicles, and robots.

Taking a vehicle as an example, in the prior art, a positioning method mainly includes: acquiring on-board radar information collected by an on-board radar set on the vehicle, and combining the on-board radar information with a preset high-precision map to obtain the positioning information of the vehicle.

SUMMARY

According to one aspect of an embodiment of the present disclosure, the embodiment of the present disclosure provides a positioning method, and the method includes:

receiving a broadcast message broadcast by a first object, the broadcast message carrying broadcast positioning information of the first object;

recognizing a collected image of a second object to obtain recognition information of the second object, the recognition information including image recognition positioning information of the second object; and determining location information of the control device according to the broadcast positioning information and the image recognition positioning information.

In some embodiments, the determining the location information of the control device according to the broadcast positioning information and the image recognition positioning information, includes:

determining a coordinate conversion parameter according to the broadcast positioning information and the image recognition positioning information; and generating the location information according to the coordinate conversion parameter and the image recognition positioning information.

In some embodiments, the broadcast message further carries attribute information of the first object, the recognition information further includes attribute information of the second object; and the determining a coordinate conversion parameter according to the broadcast positioning information and the image recognition positioning information, includes:

selecting an identical object from the first object and the second object according to the attribute information of the first object and the attribute information of the second object; and determining the coordinate conversion parameter according to broadcast positioning information and image recognition positioning information of the identical object.

In the embodiment of the present disclosure, an identical object is selected to determine the coordinate conversion parameter based on the broadcast positioning information and image recognition positioning information of the identical object.

In some embodiments, the broadcast positioning information includes a world coordinate parameter and a precision parameter, and the image recognition positioning information includes an image coordinate parameter; and the determining the coordinate conversion parameter according to broadcast positioning information and image recognition positioning information of the identical object, includes:

selecting an object with a precision parameter greater than a preset threshold from the identical object; and determining the coordinate conversion parameter according to the world coordinate parameter and image coordinate parameter of the selected object.

In some embodiments, the determining location information of the control device according to the broadcast positioning information and the image recognition positioning information, includes:

correcting the image recognition positioning information according to the broadcast positioning information, and determining the location information of the control device based on the corrected image recognition positioning information; or, correcting the broadcast positioning information according to the image recognition positioning information, and determining the location information of the control device based on the corrected broadcast positioning information.

In some embodiments, the first object includes roadside equipment and/or a vehicle, and the second object includes roadside equipment and/or a vehicle.

In some embodiments, the roadside equipment includes at least one of a traffic light, a traffic sign, a charging pile, a roadside parking charging device, and a roadside unit.

In some embodiments, in case that the first object is the vehicle, the attribute information of the first object includes at least one of the identification of the vehicle, the model of the vehicle, the color of the vehicle, the speed of the vehicle, and the driving direction of the vehicle.

According to one aspect of an embodiment of the present disclosure, the embodiment of the present disclosure provides a positioning device, and the positioning device includes:

a receiving module, configured to receive a broadcast message broadcast by a first object, the broadcast message carrying broadcast positioning information of the first object;

a recognition module, configured to recognize a collected image of a second object to obtain recognition information of the second object, and the recognition information includes image recognition positioning information of the second object; and a determining module, configured to determine location information according to the broadcast positioning information and the image recognition positioning information.

In some embodiments, the determining module is configured to determine a coordinate conversion parameter based on the broadcast positioning information and the image recognition positioning information, and generate the location information based on the coordinate conversion parameter and the image recognition positioning information.

In some embodiments, the broadcast message further carries attribute information of the first object, and the recognition information further includes attribute information of the second object; and the determining module is configured to select an identical object from the first object and the second object according to the attribute information of the first object and the attribute information of the second object, and determine the coordinate conversion parameter according to the broadcast positioning information and the image recognition positioning information of the identical object.

In some embodiments, the broadcast positioning information includes a world coordinate parameter and a precision parameter, and the image recognition positioning information includes an image coordinate parameter; and the determining module is configured to select an object with a precision parameter greater than a preset threshold from the identical object, and determine the coordinate conversion parameter according to the world coordinate parameter and image coordinate parameter of the selected object.

In some embodiments, the determining module is configured to correct the image recognition positioning information according to the broadcast positioning information, and determine the position information based on the corrected image recognition positioning information; or correct the broadcast positioning information according to the image recognition positioning information, and determine the location information based on the corrected broadcast positioning information.

In some embodiments, the first object includes roadside equipment and/or a vehicle, and the second object includes roadside equipment and/or a vehicle.

In some embodiments, the roadside equipment includes at least one of a traffic light, a traffic sign, a charging pile, a roadside parking charging device, and a roadside unit.

In some embodiments, in case that the first object is the vehicle, the attribute information of the first object includes at least one of the identification of the vehicle, the model of the vehicle, the color of the vehicle, the speed of the vehicle and the driving direction of the vehicle.

According to one aspect of an embodiment of the present disclosure, the embodiment of the present disclosure provides an electronic device, including:

at least one processor; and a memory communicatively connected to the at least one processor; where, the memory stores instructions executable by the at least one processor, the instructions being executed by the at least one processor to enable the at least one processor to execute the method described in any one of the above embodiments.

According to one aspect of an embodiment of the present disclosure, the embodiment of the present disclosure provides on-board equipment, and the on-board equipment includes the positioning device described in any one of the above embodiments, or the electronic device described in the above-mentioned embodiment.

According to one aspect of an embodiment of the present disclosure, the embodiment of the present disclosure provides a vehicle, and the vehicle includes the on-board equipment described in the above-mentioned embodiment, and further includes an image acquisition device, the image acquisition device being used to acquire an image of a second object and send the collected image to the on-board equipment.

According to one aspect of an embodiment of the present disclosure, the embodiment of the present disclosure provides a positioning system, and the positioning system includes the vehicle as described in the above embodiment and further includes a first object establishing a communication connection with the vehicle.

According to one aspect of an embodiment of the present disclosure, the embodiment of the present disclosure provides a non-instantaneous computer readable storage medium storing computer instructions, the computer instructions being used to enable the computer to execute the method described in any one of the above embodiments.

According to one aspect of an embodiment of the present disclosure, the embodiment of the present disclosure provides a positioning method, which is applied to a control device storing broadcast positioning information of a first object, and the method includes:

recognizing a collected image of a second object to obtain recognition information of the second object, the recognition information including image recognition positioning information of the second object;

determining location information of the control device according to the broadcast positioning information and the image recognition positioning information.

The embodiment of the present disclosure provides a positioning method and device, on-board equipment, a vehicle, an electronic device, a positioning system, and a storage medium, including: receiving a broadcast message broadcast by a first object, the broadcast message carrying broadcast positioning information of the first object, recognizing a collected image of a second object to acquire recognition information of the second object, the recognition information includes image recognition positioning information of the second object, and determining location information of a control device according to the acquired broadcast positioning information and image recognition positioning information, the location information of the control device is determined through the acquired broadcast positioning information and image recognition positioning information.

BRIEF DESCRIPTION OF THE DRAWINGS

The drawings are used to better understand the solution, and do not constitute a limitation to the present disclosure.

FIG. 3 is a schematic flowchart of a positioning method according to another embodiment of the disclosure;

FIG. 4 is a schematic principle diagram of determining positioning information according to an embodiment of the present disclosure;

DETAILED DESCRIPTION OF THE EMBODIMENTS

The following describes exemplary embodiments of the embodiments of the present disclosure with reference to accompanying drawings, where the exemplary embodiment includes various details of the embodiments of the present disclosure to facilitate understanding, and should be considered as merely exemplary. Therefore, those of ordinary skill in the art should realize that various changes and modifications can be made to the embodiments described herein without departing from scope and spirit of the embodiments of the present disclosure. Likewise, for clarity and conciseness, descriptions of common functions and structures are omitted in the following description.

Figure 1:
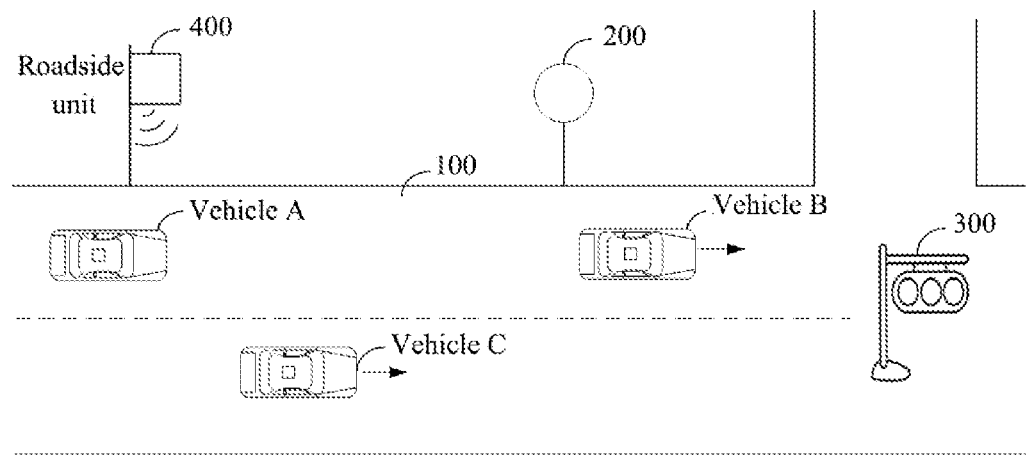
FIG. 1 is an application scenario schematic diagram of a positioning method according to an embodiment of the disclosure.

Please refer to FIG. 1, which is an application scenario schematic diagram of a positioning method according to an embodiment of the disclosure.

As shown in FIG. 1, a vehicle A, a vehicle B, and a vehicle C are respectively traveling on a road 100, and the road 100 is further provided with a traffic sign 200, a traffic light 300, and a roadside unit 400.

Where, the traffic sign 200 can be used to indicate speed limit information, such as a speed limit of 60 km/h; certainly, the traffic sign 200 can also be used to indicate direction information on the road 100, for example, a left turn icon is set on the traffic sign.

Where, the road side unit 400 (Road Side Unit, RSU) is installed on at least one side of the road 100, and can use dedicated short range communication (Dedicated Short Range Communication, DSRC) technology to communicate with a vehicle, or use 3G/4G/5G and other communication technologies to communicate with a vehicle, for example, the roadside unit 400 can communicate with an on board unit (On Board Unit, OBU) installed on a vehicle (vehicle A, vehicle B, and vehicle C as shown in FIG. 1), so as to achieve vehicle identification and/or electronic deduction.

Certainly, in some embodiments, the road 100 may also be provided with other devices, such as a charging pile, a roadside parking charging device, and so on.

Where, the roadside parking charging device includes, but is not limited to, an electronic toll collection (Electronic Toll Collection, ETC).

In order to ensure driving safety of a vehicle (such as vehicle A, vehicle B, and vehicle C), it is necessary to locate the vehicle and obtain positioning information, so that current driving information of the vehicle may be adaptively adjusted based on the positioning information. Where, the current driving information includes but is not limited to speed, direction, and acceleration.

Where, the positioning information here includes not only location information of the vehicle itself, but also position information between the vehicles, and position information between the vehicle and other devices (such as the traffic sign 200 and the traffic light 300 listed above).

Taking vehicle A and vehicle B in FIG. 1 as an example, positioning information corresponding to vehicle A may include location information of vehicle A (which may be a coordinate of vehicle A in the world coordinate system), and may also include location information between vehicle A and vehicle B (which may be the distance between vehicle A and vehicle B).

When vehicle A determines the positioning information corresponding to vehicle A, it can adjust the speed and direction of vehicle A based on the determined positioning information to avoid a collision between vehicle A and vehicle B when the speed of vehicle A is high, so as to ensure safe driving of vehicle A and, certainly, safe driving of vehicle B can also be ensured as much as possible.

Hereinafter, specific embodiments are used to describe technical solutions of the present disclosure and how the technical solutions of the present application solve the above-mentioned technical problems in detail. The following specific embodiments may be combined with each other, and same or similar concepts or processes may not be repeated in some embodiments. The embodiments of the present disclosure will be described below with reference to the accompanying drawings.

According to one aspect of an embodiment of the present disclosure, the embodiment of the present disclosure provides a positioning method, and the positioning method may be applied to a control device.

Figure 2:
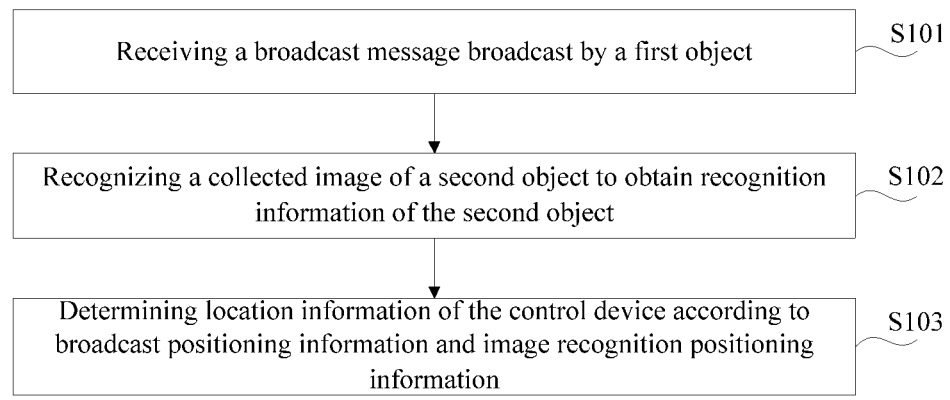
FIG. 2 is a schematic flowchart of a positioning method according to an embodiment of the disclosure.

Please refer to FIG. 2, which is a schematic flowchart of a positioning method according to an embodiment of the disclosure.

As shown in FIG. 2, the method includes:

S101: receiving a broadcast message broadcast by a first object, the broadcast message carrying broadcast positioning information of the first object.

Where, execution entity of the embodiment of the present disclosure may be a positioning device, and the positioning device is provided in a control device, certainly, the execution entity of the embodiment of the present disclosure may also be the control device. When the positioning method of the embodiment of the present disclosure is applied to the application scenario shown in FIG. 1, the positioning device (or the control device) may be a computer, a server, an on-board terminal, a chip (such as an embedded chip), etc. And the positioning device (or the control device) may be set on a vehicle, for example, the positioning device (or the control device) may be set on vehicle A, vehicle B, and vehicle C in the application scenario shown in FIG. 1 to ensure safe driving of vehicle A, vehicle B, and vehicle C, certainly, the control device may also be vehicle A, vehicle B, and vehicle C.

Where, the broadcast message is used to represent the message broadcast by the first object through communication protocol, and other objects (referring to objects other than the first object) may receive the broadcast message.

Where, the broadcast positioning information is used to represent location-related information of the first object.

That is, in the embodiment of the present disclosure, the positioning device may receive the broadcast message of the first object, and collect the broadcast positioning information from the broadcast message.

In some embodiments, the first object includes roadside equipment and/or a vehicle.

Where, the roadside equipment may include equipment provided on the road, equipment provided on at least one side of the road, or equipment with a preset distance from the road within a preset range, and so on.

In other words, the roadside equipment may be equipment provided on the road, or equipment with a certain distance from the road.

Where, the roadside equipment includes the traffic light, traffic sign, and roadside unit as shown in FIG. 1, and may further includes a charging pile, roadside parking charging equipment, and so on.

That is, in the embodiment of the present disclosure, the positioning device may communicate with the first object, so as to receive the broadcast message broadcast by the first object, so as to obtain the broadcast positioning information of the first object.

Where, the establishment of communication between the positioning device and the first object may be achieved through a manner of "first registration+re-login".

Specifically, when the positioning device establishes a communication connection with the first object for the first time, the positioning device may send a request message for requesting registration to the first object based on an acquired address information of the first object, and the request message carries attribute information of the positioning device, the attribute information of the positioning device is used to represent characteristics of the positioning device, including but not limited to identification of the positioning device.

After verifying the request message, the first object may send to the positioning device a feedback message characterizing agreement to establish a communication connection.

The positioning device may set a login name and a login password, and after a first communication connection is established (that is, any connection after the first connection), connect to the first object based on the login name and login password.

Based on the above-mentioned example, it should be known that there may be one or more first objects. In some embodiments, it is feasible for each first object to broadcast its corresponding location-related information, that is, each first object broadcasts its location-related information, or location-related information corresponding to each first object may be broadcast by a certain first object in each first object.

For example, with reference to FIG. 1, it can be seen that the first object includes a traffic light, a traffic sign, a roadside unit, and a vehicle (specifically including vehicle A, vehicle B, and vehicle C), thus in some embodiments:

a traffic light broadcasts its location-related information; a traffic sign broadcasts its location-related information; a roadside unit broadcasts its location-related information; a vehicle broadcasts its location-related information.

And in other embodiments:

a roadside unit collects and broadcasts location-related information of a traffic light, and the roadside unit collects and broadcasts location-related information of a traffic sign; and a vehicle broadcasts its location-related information.

And in other embodiments:

a roadside unit collects and broadcasts location-related information of a traffic light, and a roadside unit collects and broadcasts location-related information of a traffic sign, and a roadside unit collects and broadcasts location-related information of a vehicle.

S102: recognizing a collected image of a second object to obtain recognition information of the second object, and the recognition information includes image recognition positioning information of the second object.

In some embodiments, an image acquisition device may be provided, and the image acquisition device collects an image of the second object and sends the image of the second object to the positioning device, and the positioning device recognizes the image of the second object to obtain recognition information of the second object.

Where, the image acquisition device may be a camera.

It is worth noting that the camera has a certain collection range, therefore, the second object may be an object whose distance from the camera is within the collection range.

Taking an image acquisition device and a positioning device both provided on vehicle A in FIG. 1 as an example, the description is as follows: the image acquisition device collects images of objects around vehicle A (within the acquisition range), such as vehicle B, vehicle C, traffic sign, and traffic light shown in FIG. 1.

Certainly, in some other embodiments, an image acquisition device and a positioning device may be integrated, that is, the image acquisition device is a part of the positioning device.

Take the image acquisition device as a camera as an example: the positioning device includes a camera and a processor, the camera collects an image of a second object, and sends the collected image of the second object to the processor, the processor recognizing the image of the second object.

Where, the second object may also include roadside equipment and/or a vehicle. For descriptions of the roadside equipment and/or the vehicle, please refer to the above-mentioned examples, which will not be repeated here.

Certainly, in another embodiment, an image acquisition device may also recognize a collected image of a second object to obtain recognition information of the second object, and send the recognition information to a positioning device.

Where, specific implementation method of recognizing the image of the second object to obtain the second object recognition information may refer to image recognition technology in the prior art, which will not be repeated here.

S103: determining location information of the control device according to broadcast positioning information and image recognition positioning information.

In this step, when both the broadcast positioning information and the image recognition positioning information are known, the location information of the control device may be determined through conversion and calculation.

In some embodiments, if there are a plurality of first objects and a plurality of second objects, at least one may be selected from the first objects and the second objects respectively, and the location information of the control device may be determined based on broadcast positioning information of the at least one first object and image recognition positioning information of the at least one second object.

In other embodiments, if there are a plurality of first objects and a second object, at least one first object may be selected from the first objects, and the location information of the control device may be determined based on broadcast positioning information of the at least one first object and image recognition positioning information of the second object.

Similarly, in other embodiments, if there is a first object and a plurality of second objects, at least one second object may be selected from the second objects, and the location information of the control device may be determined based on broadcast positioning information of the first object and image recognition positioning information of the at least one second object.

That is, in the embodiment of the present disclosure, the location information of the control device may be determined by related information (including broadcast positioning information and image recognition positioning information) of at least part of the first objects and/or the second objects.

With reference to the application scenario shown in FIG. 1, a first object may include vehicle B, a roadside unit, and a traffic light, and a second object may also include vehicle B and a roadside unit, so both the first object and the second object includes vehicle B and a roadside unit.

In this step, the location information of the control device may be determined based on broadcast positioning information corresponding to each of vehicle B, a roadside unit, and a traffic light, and image recognition positioning information corresponding to each of vehicle B and the roadside unit.

Or, in this step, the location information of the control device may also be determined based on broadcast positioning information corresponding to each of vehicle B and a roadside unit, and image recognition positioning information corresponding to each of vehicle B and the roadside unit.

Or, in this step, the location information of the control device may also be determined based on broadcast positioning information corresponding to vehicle B and image recognition positioning information corresponding to vehicle B.

Or, in this step, the location information of the control device may also be determined based on broadcast positioning information corresponding to a roadside unit and image recognition positioning information corresponding to vehicle B.

Where, by constructing a matrix of each broadcast positioning information and each image recognition positioning information, the position information of the control device is determined.

With reference to the background technology, it can be known that positioning information is determined by combining a high-precision map in the prior art.

In the embodiments of the present disclosure, after creative work, the inventor comes up with an inventive concept that is completely different from the prior art, that is, communication between a positioning device and a peripheral equipment is used to determine location-related information of the peripheral equipment, and the location information of the control device is determined by combining the location-related information of the peripheral device, specifically:

Based on the above-mentioned analysis, it can be known that the embodiment of the present disclosure provides a positioning method, and the method includes: receiving a broadcast message broadcast by a first object, the broadcast message carrying broadcast positioning information of the first object, recognizing a collected image of a second object to acquire recognition information of the second object, the recognition information includes image recognition positioning information of the second object, and determining location information of a control device according to the acquired broadcast positioning information and image recognition positioning information, by acquiring the broadcast positioning information and the image recognition positioning information respectively, the location information of the control device is determined through the acquired broadcast positioning information and image recognition positioning information, which avoids a problem that collection and production costs are high when determining the location information of the control device based on a high-precision map in the prior art, and has achieved a technical effect of saving costs.

In some embodiments, the method may further include: broadcasting location information of a control device.

Taking a positioning device provided on vehicle A in FIG. 1 as an example, description is as follows:

After determining location information of vehicle A, the positioning device provided on vehicle A may broadcast the location information of vehicle A, and vehicle B and/or vehicle C receive the location information of vehicle A, and adjust current driving state of each based on the location information of vehicle A, to avoid traffic accident such as vehicle B and/or vehicle C colliding with vehicle A, thereby ensuring safe driving of each vehicle.

Please refer to FIG. 3, which is a schematic flowchart of a positioning method according to the other embodiment of the present disclosure.

As shown in FIG. 3, the method includes:

S201: receiving a broadcast message broadcast by a first object, the broadcast message carrying broadcast positioning information of the first object.

Where, description of this step can refer to S101 in the above-mentioned examples, which will not be repeated here.

S202: recognizing a collected image of a second object to obtain recognition information of the second object, and the recognition information includes image recognition positioning information of the second object.

Where, description of this step can refer to S102 in the above-mentioned examples, which will not be repeated here.

S203: determining a coordinate conversion parameter according to broadcast positioning information and image recognition positioning information.

In this step, a coordinate system switching calculation may be performed based on the determined broadcast positioning information and image recognition positioning information, so as to obtain the coordinate conversion parameter.

In some embodiments, the broadcast message further carries attribute information of the first object, and the recognition information further includes attribute information of the second object. S203 may specifically include: selecting an identical object from the first object and the second object according to the attribute information of the first object and the attribute information of the second object; determining the coordinate conversion parameter according to broadcast positioning information and image recognition positioning information of the identical object. Since the coordinate conversion parameter is determined based on the identical object, reliability and accuracy of the coordinate conversion parameter can be ensured.

Where, the attribute information of the first object is information used to represent characteristics of the first object, such as a characteristic of size of the first object, a characteristic of shape of the first object, and so on.

Where, when the first object is roadside equipment, the attribute information of the first object includes, but is not limited to, the identification of the roadside equipment, the shape of the roadside equipment, and the size of the roadside equipment.

In some embodiments, the identification of the roadside equipment may be a device code of the roadside equipment, or may be a preset character string composed of letters and/or numbers.

Where, when the first object is a vehicle, the attribute information of the first object includes but is not limited to the identification of the vehicle, the model of the vehicle, the color of the vehicle, the speed of the vehicle, and the driving direction of the vehicle.

In some embodiments, identification of a vehicle may be a license number of the vehicle, or a code of a positioning device, or may be a preset character string composed of letters and/or numbers.

Where, the attribute information of the second object is information used to represent characteristics of the second object, specifically, for the specific description of the attribute information of the second object, please refer to the above-mentioned description of the attribute information of the first object, which will not be repeated here.

Where, the first object is an object that broadcasts a broadcast message, it can be understood that due to factors such as signal transmission information (such as signal transmission frequency and signal transmission distance), the broadcast message will also be subject to a certain range of restrictions, that is, there is a certain distance between the object and a positioning device, and the distance may be within a certain range. Based on the above-mentioned examples, it can be known that there is also a certain distance between the second object and a positioning device, and the distance may also be within a certain range. Therefore, the range corresponding to the first object and the range corresponding to the second object may have a certain intersection range, and there may be an intersection between the first object and the second object, that is, the first object may be the second object, and the second object may also be the first object.

Therefore, in this step, it is equivalent to selecting an identical object from the first object and the second object, the identical object is both the first object and the second object, and the implementation of selecting the identical object may be implemented based on attribute information of each object (including the first object and the second object).

Specifically, it is determined whether attribute information of a first object and attribute information of a second object are the same, and if they are the same, the first object and the second object with same attribute information are determined to be the same object (that is, the identical object).

An exemplary description will now be made with reference to FIG. 1 (taking a positioning device provided on vehicle A as an execution entity):

For example, if the first object includes a traffic light, a traffic sign, a roadside unit, vehicle B, and vehicle C, and the second object includes a roadside unit and vehicle C, the identical objects are the roadside unit and vehicle C.

For another example, if the first object includes a roadside unit and vehicle B, and the second object includes a traffic light, a roadside unit and vehicle C, the identical object is the roadside unit.

After determining the identical object, a coordinate conversion parameters may be determined based on broadcast positioning information and image recognition positioning information of the identical object In some embodiments, the broadcast positioning information includes a world coordinate parameter and a precision parameter, and the image recognition positioning information includes an image coordinate parameter; determining the coordinate conversion parameter according to coordinate conversion parameter and image recognition positioning information of the identical object includes: selecting an object whose precision parameter is greater than a preset threshold; and determining the coordinate conversion parameter according to world coordinate parameter and image coordinate parameter of the selected object.

Where, the preset threshold may be determined based on requirement, experience and experiment.

In some embodiments, the preset threshold may be a precision parameter used as a reference.

It is worth noting that precision parameters of different objects may be different, and relatively speaking, the larger a precision parameter, the higher accuracy and reliability of a world coordinate parameter of an object. Therefore, in the embodiment of the present disclosure, by selecting object whose precision parameter is greater than a preset threshold from the identical object, so that subsequent calculation of a coordinate conversion parameter is performed based on a world coordinate parameter of the selected object, the technical effect of improving accuracy and reliability of the determined coordinate transformation parameter may be achieved.

In some embodiments, selecting object whose precision parameter is greater than a preset threshold from the identical object specifically includes: sorting precision parameters of the identical objects, and selecting an object whose precision parameter is greater than a preset threshold based on the sorting.

For example, precision parameters of the identical objects are sorted in descending order, and an object whose precision parameter is greater than a preset threshold is selected based on the descending order.

For another example, precision parameters of the identical objects are sorted in ascending order, and object whose precision parameter is greater than a preset threshold is selected based on the ascending order.

In other embodiments, an object with a larger precision parameter may be selected from the identical objects based on a preset percentage.

For example, if there are five identical objects and the preset percentage is 40%, the number of selected objects is two, and precision parameters of the identical objects are sorted in descending order, two objects starting from the identical object with the largest precision parameter are selected.

Taking the above parameter as an example, it is explained as follows with reference to FIG. 1:

If the identical objects include a traffic light, a traffic sign, a roadside unit, vehicle B, and vehicle C, and the precision parameters of the identical objects are arranged in descending order of traffic light-traffic sign-roadside unit-vehicle B-vehicle C, then the two objects selected out are the traffic light and the traffic sign.

In some embodiments, a coordinate transformation parameter may be determined by constructing a matrix.

S204: generating location information according to the coordinate conversion parameter and the image recognition positioning information.

Taking the image acquisition device as a camera as an example, the principle of determining the location information will be described in detail, and the schematic principle diagram may refer to FIG. 4.

Where, f, u0, v0, 1/dx, and 1/dy shown in FIG. 4 are internal parameters of the camera and are known parameters, f represents focal length, and dx represents how many length units each pixel in the x direction occupies, that is, the size of actual physical value represented by a pixel, and dy represents how many length units each pixel in the y direction occupies, that is, the size of actual physical value represented by a pixel.

Moreover, u0 and v0 shown in FIG. 4 represent the number of horizontal and vertical pixels that differ between the center pixel coordinate of an image and the origin pixel coordinate of the image.

Moreover, u and v in FIG. 4 recognize location information of an image of the selected object (i.e., the identical object obtained after precision parameter selection), specifically the location information is an image coordinate parameter.

Moreover, Xw, Yw, and Zw in FIG. 4 are broadcast positioning information of the selected object (i.e., the identical object obtained after the precision parameter selection) and specifically are a world coordinate parameter.

Moreover, R in FIG. 4 is a rotation parameter, and T is a translation parameter, by substituting the obtained values corresponding to the parameters in FIG. 4 into the matrix in FIG. 4, R and T may be obtained, and the world coordinate positioning information (i.e., the location information) of the positioning device may be obtained according to u, v, R and T, and specific calculation method may refer to the prior art, which will not be repeated here.

Figure 5:
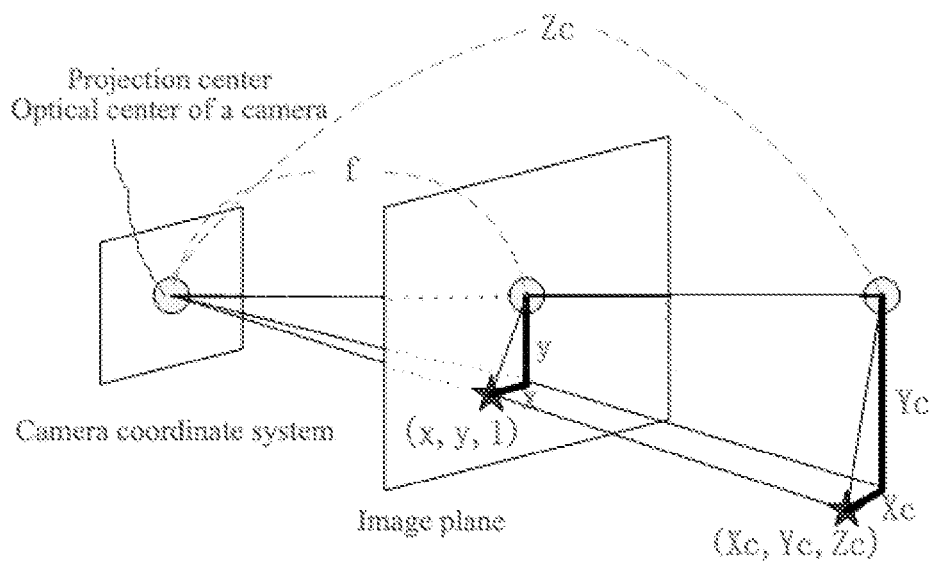
FIG. 5 is a schematic diagram of mapping relationship between a camera coordinate system and an image coordinate system according to an embodiment of the disclosure.

Based on the above-mentioned example, it can be known that images of a certain range of objects can be collected by a camera, where, the mapping relationship between a camera coordinate system and an image plane (i.e., an image coordinate system) may be seen in FIG. 5.

Where, the optical center of the camera and the projection center are the same point, f represents focal length, Zc is the main (optical) axis of the camera, and is the coordinate parameter after mapping, (x, y, 1) is the coordinate parameter corresponding to the image coordinate system, (Xc, Yc, Zc) is a coordinate parameter after mapping.

It is worth noting that the embodiments of the present disclosure only exemplarily describe the mapping between the camera coordinate system and the image coordinate system, specific mapping principle and calculation principle may refer to the prior art, and will not be repeated here.

Figure 6:
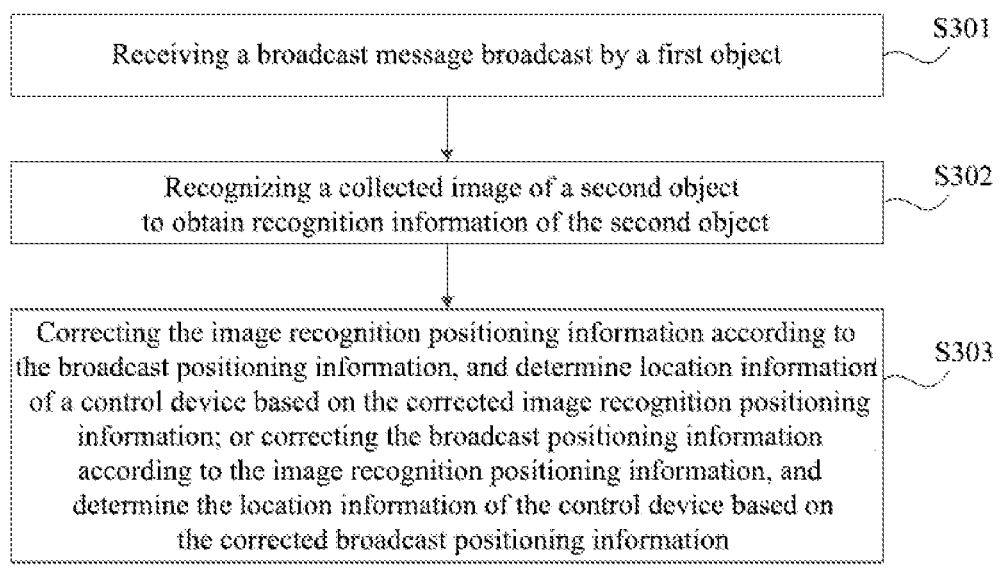
FIG. 6 is a schematic flowchart of a positioning method according to another embodiment of the disclosure.

Please refer to FIG. 6, which is a schematic flowchart of a positioning method according to another embodiment of the present disclosure.

As shown in FIG. 6, the method includes:

S301: receiving a broadcast message broadcast by a first object, the broadcast message carrying broadcast positioning information of the first object.

Where, description of this step may refer to S101 in the above-mentioned examples, which will not be repeated here.

S302: recognizing a collected image of a second object to obtain recognition information of the second object, and the recognition information includes image recognition positioning information of the second object.

Where, description of this step may refer to S102 in the above-mentioned examples, which will not be repeated here.

S303: correcting the image recognition positioning information according to the broadcast positioning information, and determining location information of a control device based on the corrected image recognition positioning information; or correcting the broadcast positioning information according to the image recognition positioning information, and determining the location information of the control device based on the corrected broadcast positioning information.

For example, the image recognition positioning information may be corrected based on the broadcast positioning information to obtain the corrected image recognition positioning information, the corrected image recognition positioning information includes the image recognition positioning information before the correction, correction parameters, and the corrected image recognition positioning information, therefore, the location information of the control device may be determined by performing a calibration calculation based on the corrected image recognition positioning information.

Similarly, the broadcast positioning information may be corrected based on the image recognition positioning information to obtain the corrected broadcast positioning information, the corrected broadcast positioning information includes the broadcast positioning information before the correction, corrected parameters, and the corrected broadcast positioning information, therefore, the location information of the control device may be determined by a performing calibration calculation based on the corrected broadcast positioning information.

Where, the calibration calculation may be achieved by adopting manners described in the above-mentioned examples, which will not be repeated here.

According to the other aspect of an embodiment of the present disclosure, the embodiment of the present disclosure further provides a positioning device.

Figure 7:
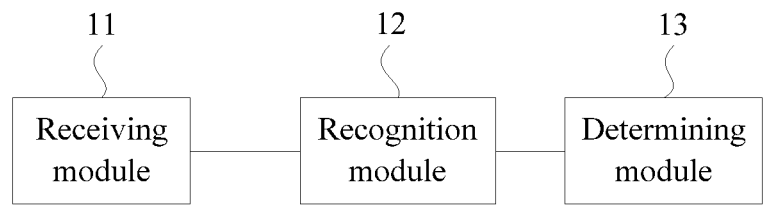
FIG. 7 is a block diagram of a positioning device according to an embodiment of the disclosure.

Please refer to FIG. 7, which is a block diagram of a positioning device according to an embodiment of the disclosure.

As shown in FIG. 7, the positioning device includes:

a receiving module 11 configured to receive a broadcast message broadcast by a first object, the broadcast message carrying broadcast positioning information of the first object;

a recognition module 12 configured to recognize a collected image of a second object to obtain recognition information of the second object, the recognition information including image recognition positioning information of the second object; and a determining module 13 configured to determine location information according to the broadcast positioning information and the image recognition positioning information.

In some embodiments, the determining module 13 is configured to determine a coordinate conversion parameter based on the broadcast positioning information and the image recognition positioning information, and generate the location information based on the coordinate conversion parameter and the image recognition positioning information.

In some embodiments, the broadcast message further carries attribute information of the first object, and the recognition information further includes attribute information of the second object; the determining module 13 is configured to select an identical object from the first object and the second object according to the attribute information of the first object and the attribute information of the second object, and determine the coordinate conversion parameter according to the broadcast positioning information and image recognition positioning information of the identical object.

In some embodiments, the broadcast positioning information includes a world coordinate parameter and a precision parameter, and the image recognition positioning information includes an image coordinate parameter; and the determining module 13 is configured to select an object whose precision parameter is greater than a preset threshold from the identical object, and determine the coordinate conversion parameter according to the world coordinate parameter and image coordinate parameter of the selected object.

In some embodiments, the determining module 13 is configured to correct the image recognition positioning information according to the broadcast positioning information, and determine the location information based on the corrected image recognition positioning information; or correct the broadcast positioning information according to the image recognition positioning information, and determine the location information based on the corrected broadcast positioning information.

In some embodiments, the first object includes roadside equipment and/or a vehicle, and the second object includes roadside equipment and/or a vehicle.

In some embodiments, the roadside equipment includes at least one of a traffic light, a traffic sign, a charging pile, a roadside parking charging device, and a roadside unit.

In some embodiments, when the first object is the vehicle, the attribute information of the first object includes at least one of the identification of the vehicle, the model of the vehicle, the color of the vehicle, the speed of the vehicle, and the driving direction of the vehicle.

According to another aspect of an embodiment of the present disclosure, the embodiment of the present disclosure further provides an electronic device and a readable storage medium.

Figure 8:
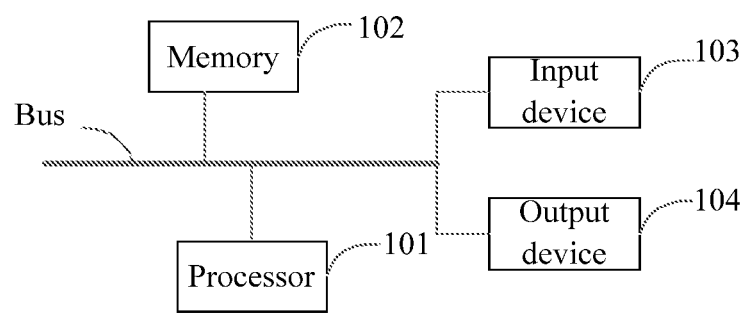
FIG. 8 is a block diagram of an electronic device according to an embodiment of the disclosure.

Please refer to FIG. 8, which is a block diagram of an electronic device according to an embodiment of the disclosure Where, the electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components shown herein, their connections and relationships, and their functions are merely examples, and are not intended to limit the implementations of the embodiments of the present disclosure described and/or required herein.

As shown in FIG. 8, the electronic device includes one or more processors 101, a memory 102, and interfaces for connecting various components, including a high-speed interface and a low-speed interface. The various components are connected to each other by using different buses, and may be installed on a common motherboard or installed in other ways as required. The processor may process instructions executed in the electronic device, including instructions stored in or on the memory to display graphical information of the GUI on an external input/output device (such as a display device coupled to an interface). In other implementations, if necessary, a plurality of processors and/or a plurality of buses may be used with a plurality of memories. Similarly, a plurality of electronic devices may be connected, and each device provides some necessary operations (for example, as a server array, a group of blade servers, or a multi-processor system). One processor 101 is taken as an example in FIG. 8.

The memory 102 is a non-instantaneous computer readable storage medium provided by the embodiment of the present disclosure. Where, the memory stores instructions executable by at least one processor, so that the at least one processor executes the positioning method provided by the embodiment of the present disclosure. The non-instantaneous computer readable storage medium of the embodiment of the present disclosure stores computer instructions used to enable a computer to execute the positioning method provided by the embodiment of the present disclosure As a non-instantaneous computer readable storage medium, the memory 102 can be used to store non-instantaneous software programs, non-instantaneous computer executable programs, and modules, such as program instructions/modules in the embodiments of the present disclosure. The processor 101 executes various functional applications and data processing of a server by running non-instantaneous software programs, instructions, and modules stored in the memory 102, that is, implements the positioning method in the above-mentioned method embodiment.

The memory 102 may include a program storage area and a data storage area, where, the program storage area may store an operating system and an application program required by at least one function; the data storage area may store data created according to the usage of the electronic device, and the like. In addition, the memory 102 may include a high-speed random access memory, and may further include a non-instantaneous memory, such as at least one magnetic disk storage device, a flash memory device, or other non-instantaneous solid-state storage devices. In some embodiments, the memory 102 may alternatively include memories remotely provided with respect to the processor 101, and these remote memories may be connected to the electronic device through a network. Examples of the above-mentioned network includes, but are not limited to, the Internet, a corporate intranet, a local area network, a Blockchain-based Service Network (BSN), a mobile communication network, and combinations thereof.

The electronic device may further include: an input device 103 and an output device 104. The processor 101, the memory 102, the input device 103, and the output device 104 may be connected by a bus or in other ways. The connection by a bus is taken as an example in FIG. 8.

The input device 103 may receive input digital or character information, and generate key signal input related to user settings and function control of the electronic device, such as a touch screen, a keypad, a mouse, a track pad, a touch pad, a pointing stick, one or more mouse buttons, a trackball, a joystick, and other input devices. The output device 104 may include a display device, an auxiliary lighting device (for example, a LED), a tactile feedback device (for example, a vibration motor), and the like. The display device may include, but is not limited to, a liquid crystal display (liquid crystal display, LCD), a light emitting diode (light emitting diode, LED) display, and a plasma display. In some embodiments, the display device may be a touch screen.

Various implementations of the systems and techniques described herein may be implemented in a digital electronic circuit system, an integrated circuit system, a dedicated ASIC (application specific integrated circuits, ASIC), computer hardware, firmware, software, and/or combinations thereof. These various embodiments may include: being implemented in one or more computer programs, the one or more computer programs may be executed and/or interpreted on a programmable system including at least one programmable processor, the programmable processor may be a dedicated or general-purpose programmable processor, which may receive data and instructions from a storage system, at least one input device, and at least one output device, and transmit the data and instructions to the storage system, the at least one input device, and the at least one output device.

These calculation programs (also called programs, software, software applications, or codes) include machine instructions of a programmable processor, and may be implemented using high-level procedures and/or object-oriented programming languages, and/or assembly/machine language. As used herein, the terms "machine readable medium" and "computer readable medium" refer to any computer program product, device, and/or apparatus (for example, a magnetic disk, an optical disk, a memory, a programmable logic device (programmable logic device, PLD)) used to provide machine instructions and/or data to a programmable processor, including a machine readable medium receiving machine instructions as machine readable signals. The term "machine-readable signal" refers to any signal used to provide machine instructions and/or data to a programmable processor.

In order to provide interaction with a user, the systems and techniques described here may be implemented on a computer, and the computer includes: a display device for displaying information to the user (for example, a CRT (cathode ray tube, CRT) or a LCD (liquid crystal display, LCD) monitor); and a keyboard and a pointing device (for example, a mouse or a trackball) through which the user may provide a input to the computer. Other types of devices may also be used to provide interaction with the user; for example, the feedback provided to the user may be any form of sensory feedback (for example, a visual feedback, an auditory feedback, or a tactile feedback); and may receive an input from the user in any form (including an acoustic input, a voice input, or a tactile input).

The systems and technologies described herein may be implemented in a computing system including a back-end component (for example, as a data server), or a computing system including a middleware component (for example, an application server), or a computing system including a front-end component (for example, a user computer with a graphical user interface or a web browser, and the user may interact with the implementations of the systems and technologies described herein through the user computer), or a computing system including combinations of the back-end component, the middleware component, and the front-end component. The components of the system may be connected to each other through any form or medium of digital data communication (for example, a communication network). Examples of communication networks including: a local area network (local area network, LAN), a block-chain-based service network (block-chain-based service network, BSN), a wide area network (wide area network, WAN), and the Internet.

The computer system may include a client and a server. The client and the server are generally far away from each other and usually interact through a communication network. The relationship between the client and the server is generated by computer programs running on the corresponding computers and having a client-server relationship with each other.

According to another aspect of an embodiment of the present disclosure, the embodiments of the present disclosure further provides on-board equipment, and the on-board equipment includes the positioning device described in any one of the above-mentioned embodiments, or includes the electronic device described in the above-mentioned embodiment.

In some embodiments, the on-board equipment may be a computer, a server, an on-board terminal, a chip (such as an embedded chip), and the like.

According to another aspect of an embodiment of the present disclosure, the embodiment of the present disclosure further provides a vehicle, the vehicle includes the on-board equipment described in the above-mentioned embodiment, and the vehicle further includes an image acquisition device, the image acquisition device being used to collect an image of a second object and send the collected image to the on-board equipment.

Where, the image acquisition device includes a camera, and the camera may be set on the front of the vehicle, the back of the vehicle, the side of the vehicle, or other positions.

According to another aspect of an embodiment of the present disclosure, the embodiment of the present disclosure further provides a positioning system, and the positioning system includes the vehicle as described in the above-mentioned embodiment, and further includes a first object communicating with the vehicle.

Taking FIG. 1 as an example, the positioning system includes vehicle A, vehicle B, vehicle C, a roadside unit, a traffic sign, and a traffic light.

According to another aspect of an embodiment of the present disclosure, the embodiment of the present disclosure further provides a positioning method.

Figure 9:
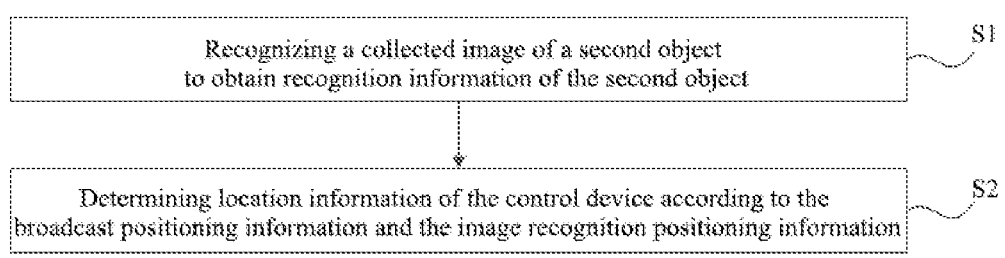
FIG. 9 is a schematic flowchart of a positioning method according to an embodiment of the disclosure.

Please refer to FIG. 9, which is a schematic flowchart of a positioning method according to an embodiment of the disclosure.

Where, the method may be applied to a control device, and the control device stores broadcast positioning information of a first object. As shown in FIG. 9, the method includes:

S1: recognizing a collected image of a second object to obtain recognition information of the second object, the recognition information including image recognition positioning information of the second object.

S2: determining location information of the control device according to the broadcast positioning information and the image recognition positioning information.

In an embodiment of the present disclosure, on-board equipment may store the broadcast positioning information of the first object in advance, and after obtaining the image recognition positioning information of the second object, determine the location information of the control device according to the broadcast positioning information and the image recognition positioning information.

In some embodiments, the first object includes at least part of the second object.

It should be understood that the various forms of processes shown above may be used by reordering, adding, or deleting steps. For example, the steps described in the present disclosure may be executed in parallel, sequentially, or in a different order, as long as desired results of the technical solutions of the present disclosure can be achieved, and will not be limited herein.

The above-mentioned specific implementations do not constitute a limitation on the protection scope of the present disclosure. Those skilled in the art should understand that various modifications, combinations, sub-combinations, and substitutions can be made according to design requirements and other factors. Any modification, equivalent substitution, and improvement made within the spirit and principles of the disclosure should be included in the protection scope of the disclosure.

What is claimed is:

1. A positioning method, wherein the method is applied in a control device and comprises:
   receiving a broadcast message broadcast by a first object, the broadcast message carrying broadcast positioning information of the first object;
   recognizing a collected image of a second object to obtain recognition information of the second object, the recognition information comprising image recognition positioning information of the second object; and
   determining location information of the control device according to the broadcast positioning information and the image recognition positioning information,
   wherein the broadcast positioning information comprises a world coordinate parameter, and the location information of the control device is world coordinate positioning information.

2. The method according to claim 1, wherein the determining the location information of the control device according to the broadcast positioning information and the image recognition positioning information, comprises:
   determining a coordinate conversion parameter according to the broadcast positioning information and the image recognition positioning information; and generating the location information according to the coordinate conversion parameter and the image recognition positioning information.

3. The method according to claim 2, wherein the broadcast message further carries attribute information of the first object, and the recognition information further comprises attribute information of the second object; and
the determining a coordinate conversion parameter according to the broadcast positioning information and the image recognition positioning information, comprises:
selecting an identical object from the first object and the second object according to the attribute information of the first object and the attribute information of the second object; and
determining the coordinate conversion parameter according to broadcast positioning information and image recognition positioning information of the identical object.

4. The method according to claim 3, wherein the broadcast positioning information further comprises a world coordinate parameter and a precision parameter, and the image recognition positioning information comprises an image coordinate parameter; and
the determining the coordinate conversion parameter according to broadcast positioning information and image recognition positioning information of the identical object, comprises:
selecting an object with a precision parameter greater than a preset threshold from the identical object; and
determining the coordinate conversion parameter according to the world coordinate parameter and image coordinate parameter of the selected object.

5. The method according to claim 1, wherein the determining location information of the control device according to the broadcast positioning information and the image recognition positioning information, comprises:
correcting the image recognition positioning information according to the broadcast positioning information, and determining the location information of the control device based on the corrected image recognition positioning information; or,
correcting the broadcast positioning information according to the image recognition positioning information, and determining the location information of the control device based on the corrected broadcast positioning information.

6. The method according to claim 1, wherein the first object comprises roadside equipment and/or a vehicle, and the second object comprises roadside equipment and/or a vehicle.

7. The method according to claim 6, wherein the roadside equipment comprises at least one of a traffic light, a traffic sign, a charging pile, a roadside parking charging device, and a roadside unit.

8. A non-transitory computer readable storage medium storing computer instructions, wherein the computer instructions are used to enable the computer to execute the method according to claim 1.

9. A positioning device, comprising:
at least one processor; and
a memory communicatively connected to the at least one processor; wherein,
the memory stores instructions executable by the at least one processor, the instructions being executed by the at least one processor to enable the at least one processor to receive a broadcast message broadcast by a first object, the broadcast message carrying broadcast positioning information of the first object;
recognize a collected image of a second object to obtain recognition information of the second object, the recognition information comprising image recognition positioning information of the second object; and
determine location information according to the broadcast positioning information and the image recognition positioning information,
wherein the broadcast positioning information comprises a world coordinate parameter, and the location information is world coordinate positioning information.

10. The device according to claim 9, wherein the at least one processor is further enabled to determine a coordinate conversion parameter based on the broadcast positioning information and the image recognition positioning information, and generate the location information based on the coordinate conversion parameter and the image recognition positioning information.

11. The device according to claim 10, wherein the broadcast message further carries attribute information of the first object, and the recognition information further comprises attribute information of the second object; the at least one processor is further enabled to select an identical object from the first object and the second object according to the attribute information of the first object and the attribute information of the second object, and determine the coordinate conversion parameter according to the broadcast positioning information and the image recognition positioning information of the identical object.

12. The device according to claim 11, wherein the broadcast positioning information further comprises a precision parameter, the image recognition positioning information comprises an image coordinate parameter; and the at least one processor is further enabled to select an object with a precision parameter greater than a preset threshold from the identical object, and determine the coordinate conversion parameter according to the world coordinate parameter and image coordinate parameter of the selected object.

13. The device according to claim 9, wherein the at least one processor is further enabled to correct the image recognition positioning information according to the broadcast positioning information, and determine the position information based on the corrected image recognition positioning information; or,
correct the broadcast positioning information according to the image recognition positioning information, and determine the location information based on the corrected broadcast positioning information.

14. The device according to claim 9, wherein the first object comprises roadside equipment and/or a vehicle, and the second object comprises roadside equipment and/or a vehicle.

15. The device according to claim 14, wherein the roadside equipment comprises at least one of a traffic light, a traffic sign, a charging pile, a roadside parking charging device, and a roadside unit.

16. The device according to claim 14, wherein in case that the first object is the vehicle, attribute information of the first object comprises at least one of an identification of the vehicle, a model of the vehicle, a color of the vehicle, a speed of the vehicle and a driving direction of the vehicle.

17. On-board equipment, comprising the positioning device according to claim 9.

18. A vehicle, wherein the vehicle comprises the on-board equipment according to claim 17 and further comprises an image acquisition device, the image acquisition device being used to acquire an image of a second object and send the collected image to the on-board equipment.

19. A positioning system, wherein the positioning system comprises the vehicle according to claim 18 and further comprises a first object establishing a communication connection with the vehicle.

20. A positioning method, wherein the method is applied to a control device, the control device storing broadcast positioning information of a first object, and the method comprises:
   recognizing a collected image of a second object to obtain recognition information of the second object, the recognition information comprising image recognition positioning information of the second object; and
   determining location information of the control device according to the broadcast positioning information and the image recognition positioning information,
   wherein the broadcast positioning information comprises a world coordinate parameter, and the location information of the control device is world coordinate positioning information.

* * * * *